US012722996B2

(12) United States Patent
Chang et al.

(10) Patent No.: US 12,722,996 B2
(45) Date of Patent: Sep. 1, 2026

(54) DIRECT HEATED EDGE DIRECTOR ASSEMBLY

(71) Applicant: CORNING INCORPORATED, Corning, NY (US)

(72) Inventors: Siyuan Chang, Corning, NY (US); Gilbert De Angelis, Lindley, NY (US); Chunhong Chelsie He, Horseheads, NY (US); Juan Camilo Isaza, Corning, NY (US); Bulent Kocatulum, Horseheads, NY (US); Timothy L Lansberry, Watkins Glen, NY (US); Kyung-jin Lee, Chungcheongnam-do (KR); Gaozhu Peng, Horseheads, NY (US); Andrew Voss Welles, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 113 days.

(21) Appl. No.: 18/838,469

(22) PCT Filed: Mar. 3, 2023

(86) PCT No.: PCT/US2023/014464
§ 371 (c)(1),
(2) Date: Aug. 14, 2024

(87) PCT Pub. No.: WO2023/177540
PCT Pub. Date: Sep. 21, 2023

(65) Prior Publication Data

US 2025/0136493 A1 May 1, 2025

Related U.S. Application Data

(60) Provisional application No. 63/320,330, filed on Mar. 16, 2022.

(51) Int. Cl.
*C03B 17/06* (2006.01)

(52) U.S. Cl.
CPC .......... *C03B 17/067* (2013.01); *C03B 17/064* (2013.01)

(58) Field of Classification Search
None
See application file for complete search history.

(56) References Cited

U.S. PATENT DOCUMENTS

2006/0016219 A1* 1/2006 Pitbladdo .............. C03B 17/067 65/29.21
2007/0130994 A1* 6/2007 Boratav ................ C03B 17/064 65/29.21

(Continued)

FOREIGN PATENT DOCUMENTS

WO 2007/067409 A2 6/2007
WO WO-2014099560 A1 * 6/2014 ........... C03B 17/068

OTHER PUBLICATIONS

International Search Report and Written Opinion of the International Searching Authority; PCT/US2023/014464; mailed on Jun. 26, 2023, 13 pages; Korean Patent Office.

*Primary Examiner* — Lisa L Herring

(57) ABSTRACT

A glass manufacturing apparatus including a forming apparatus having a forming body and a directly electrically heated edge director assembly attached thereto, the edge director assembly configured to direct a flow of molten glass from the forming body. The edge director assembly includes a plurality of bus bar assemblies connected thereto and configured to receive an electrical current. The electrical current may be a three-phase electrical current. The bus bar assemblies are supported by three-axis support assemblies that support movement of the bus bar assemblies along three orthogonal axes.

28 Claims, 8 Drawing Sheets

(56) References Cited

U.S. PATENT DOCUMENTS

2013/0319049 A1 12/2013 Grzesik et al.
2017/0349471 A1 12/2017 Boratav et al.
2020/0095154 A1* 3/2020 Hsiao .................... C03B 17/064
2020/0299172 A1* 9/2020 Boratav ................ C03B 17/064
2020/0299173 A1 9/2020 Coppola et al.
2022/0009814 A1* 1/2022 Biswas ................. C03B 5/1675

* cited by examiner

DIRECT HEATED EDGE DIRECTOR ASSEMBLY

CROSS-REFERENCE TO RELATED APPLICATIONS

This is a national stage application under 35 U.S.C. § 371 of International Application No. PCT/US2023/014464, filed on Mar. 3, 2023, which claims the benefit of priority under 35 U.S.C. § 119 of U.S. Provisional Application Ser. No. 63/320,330 filed on Mar. 16, 2022, which is incorporated herein by reference in its entirety their entireties.

FIELD

The present disclosure relates to a glass manufacturing apparatus, and in particular a forming apparatus comprising a forming body and electrically heated edge directors attached thereto and configured to control a flow of molten glass from the forming body.

BACKGROUND

Glass making processes typically include an apparatus used to form molten material into a useful end product, such as a sheet of glass. Glass sheet production may take several different forms, e.g., float processes, rolling process, and fusion processes, to name a few. In a fusion process in particular, the molten material, hereinafter referred to as molten glass, is provided to a forming body and drawn downward therefrom as a ribbon of molten glass. The ribbon of molten glass cools to form a ribbon of glass, which may be spooled for future use, or separated into individual glass sheets. During the drawing process, surface tension causes the ribbon of molten glass ribbon to contract laterally, thereby reducing the width of the subsequent cooled glass ribbon and the glass article(s) obtained therefrom. The lateral contraction causes the edges of the ribbon of molten glass to thicken, producing what are known as “beads.” To mitigate lateral contraction and control formation of the beads, devices are installed on the forming body, referred to herein as “edge directors,” that effectively lengthen the forming body and counter the width loss resulting from lateral contraction of the ribbon.

While the forming body may be formed from a refractory ceramic material, edge directors are typically metal and attached at the ends of the forming body. As the molten glass flows over surfaces of the edge directors, the temperature of the molten glass may fall below the liquidus temperature of the molten glass and the molten glass may crystalize along edges of the edge directors. This crystalline growth, referred to herein as devitrification, or “devit,” can cause defects in the glass ribbon and disrupt stable bead development. What is needed is an effective method to mitigate devit.

SUMMARY

Accordingly, in a first aspect of the disclosure, a glass forming apparatus is described comprising a forming body comprising a first converging forming surface and a second converging forming surface, the first and second converging forming surfaces joined along a bottom edge of the forming body. The glass forming apparatus further comprises an edge director assembly disposed at a first end of the forming body, the edge director assembly comprising a first edge director in contact with the first converging forming surface and a second edge director in contact with the second converging forming surface and joined to the first edge director along an edge portion joint. The glass forming apparatus still further comprises a first bus bar assembly joined to the first edge director, a second bus bar assembly joined to the second edge director, a third bus bar assembly joined to the edge director assembly at the edge portion joint. The first, second, and third bus bar assemblies are electrically connected to an electrical power supply configured to supply an alternating electrical current to the edge director assembly.

In a second aspect, the first edge director of the first aspect may comprise a first thickened bottom edge portion and the second edge director comprises a second thickened bottom edge portion, the first thickened bottom edge portion joined to the second thickened bottom edge portion at the edge portion joint.

In a third aspect, the first bus bar assembly of the second aspect may comprise a first bus bar formed from a first material joined to the first thickened edge portion and a second bus bar formed from a second material different than the first material and joined to the first bus bar.

In a fourth aspect, the second bus bar assembly of the second aspect or the third aspect may comprise a third bus bar formed from the first material and joined to the second thickened edge portion, and a fourth bus bar formed from the second material and joined to the third bus bar.

In a fifth aspect, The glass forming apparatus, the third bus bar assembly of the third or fourth aspects claim may comprise a central bus bar formed from the first material joined to the edge portion joint, a first branch bus bar joined to the central bus bar and a second branch bus bar joined to the central bus bar, the first branch bus bar comprising a first bus bar segment formed from the first material joined to the central bus bar and a second bus bar segment formed from a second material different from the first material joined to the first bus bar segment and the second branch bus bar comprising a third bus bar segment formed from the first material joined to the central bus bar and a fourth bus bar segment formed from the second material joined to the third bus bar segment.

In a sixth aspect, an interface between the first material and the second material of the first bus bar assembly, the second bus bar assembly, and the third bus bar assembly may be positioned within a surrounding deformable refractory insulating material.

In a seventh aspect, the first edge director and the second edge director of any one of the third to sixth aspects may be formed from the first material.

In an eight aspect, the first material any one of the third to the seventh aspect may comprises platinum.

In a ninth aspect, the second material of any one of the third to the eighth aspect may comprise nickel.

In a tenth aspect, the edge portion joint one of any one of the first to the ninth aspect may be positioned below the bottom edge of the forming body.

In an eleventh aspect, the first bus bar assembly and the second bus bar assembly of any one of the first aspect to the tenth aspect may be supported by a first three-axis support assembly and a second three-axis support assembly, respectively, the first three-axis support assembly and the second three-axis support assembly each configured to support movement of the respective bus bar assembly along three orthogonal axes.

In a twelfth aspect, each of the first three-axis support assembly and the second three-axis support assembly of the eleventh aspect may comprise a tiltable stage configured to accommodate a tilt of the respective first bus bar assembly and second bus bar assembly.

In a thirteenth aspect, each of the first three-axis support assembly and the second three-axis support assembly of the eleventh or the twelfth aspect may support the first bus bar assembly and second bus bar assembly, respectively, using a spring.

In a fourteenth aspect, the first three-axis support assembly of the eleventh aspect may support a first portion of the third bus bar assembly and the second three-axis support assembly supports a second portion of the third bus bar assembly.

In a fifteenth aspect, the first three-axis support assembly of the fourteenth aspect may support the first branch bus bar and the second three-axis support assembly may support the second branch bus bar.

In a sixteenth aspect, the edge director assembly of any one of the first aspect to the fifteenth aspect may comprise an end cap joined to the first edge director and the second edge director, the end cap disposed over the first end of the forming body.

In a seventeenth aspect, at least one of the first bus bar assembly, the second bus bar assembly, or the third bus bar assembly of any one of the first aspect to the sixteenth aspect may comprise a cooling channel configured to convey a cooling fluid therethrough.

In an eighteenth aspect, the cooling channel may comprise a hollow tube in fluid communication with a cooling fluid source.

In a nineteenth aspect, the hollow tube of the eighteenth aspect may not be in contact with the first material.

In a twentieth aspect, the electrical power supply of any of the first aspect to the nineteenth aspect may be configured to supply a three-phase amplitude and phase variable electrical current to the edge director assembly.

In a twenty first aspect, a first phase of the three-phase power supply of the twentieth aspect may be connected to the first bus bar assembly, a second phase of the three-phase power supply of the twentieth aspect may be connected to the second bus bar assembly, and a third phase of the three-phase power supply of the twentieth aspect may be connected to the third bus bar assembly.

In a twenty second aspect, a method of forming a glass article is disclosed, comprising supplying molten glass to a forming body comprising a first converging forming surface and a second converging forming surface opposite the first converging forming surface, and an edge director assembly disposed at a first end of the forming body, the edge director assembly comprising a first edge director in contact with the first converging forming surface and a second edge director in contact with the second converging forming surface, the first edge director and the second edge director each comprising an outward-facing surface. The method may further comprise flowing the molten glass over the converging forming surfaces of the forming body and the outward-facing surfaces of the first edge director and the second edge director, heating the edge director assembly by flowing electrical current through the edge director assembly, and drawing the molten glass from a bottom edge of the forming body.

In a twenty third aspect, the electrical current of the twenty second aspect may comprise a three-phase electrical current.

In a twenty fourth aspect, a first bus bar assembly is joined to the first edge director, a second bus bar assembly is joined to the second edge director, a third bus bar assembly is joined to a joined edge joining the first edge director to the second edge director, and the method may further comprise supplying a first phase of the three-phase electrical current to the first bus bar assembly, supplying a second phase of the three-phase electrical current to the second bus bar assembly, and supplying a third phase of the three-phase electrical current to the third bus bar assembly.

In a twenty fifth aspect, the method of the twenty third aspect may further comprise varying a magnitude or a phase angle of at least one phase of the three-phase electrical current.

In a twenty sixth aspect, a magnitude of the first phase of the twenty fourth aspect of the twenty fifth aspect may be different from at least one of a magnitude of the second phase or a magnitude of the third phase.

In a twenty seventh aspect, an amplitude and a phase of the electrical current of the twenty fourth aspect may be independent of a frequency of the electrical current.

In a twenty eighth aspect, the method of any one of the twenty third aspect to the twenty seventh aspect may further comprise supporting the first bus bar assembly and the second bus bar assembly with a first three-axis support assembly and a second three-axis support assembly, respectively, the first three-axis support assembly and the second three-axis support assembly each configured to support movement of the respective bus bar assembly along three orthogonal axes.

In a twenty ninth aspect, the first three-axis support assembly of the twenty eighth aspect may support a first portion of the third bus bar assembly and the second three-axis support assembly of the twenty eighth aspect may support a second portion of third bus bar assembly.

Both the foregoing general description and the following detailed description present embodiments intended to provide an overview or framework for understanding the nature and character of the embodiments disclosed herein. The accompanying drawings are included to provide further understanding and are incorporated into and constitute a part of this specification. The drawings illustrate various embodiments of the disclosure, and together with the description explain the principles and operations thereof.

DETAILED DESCRIPTION

Figure 1:
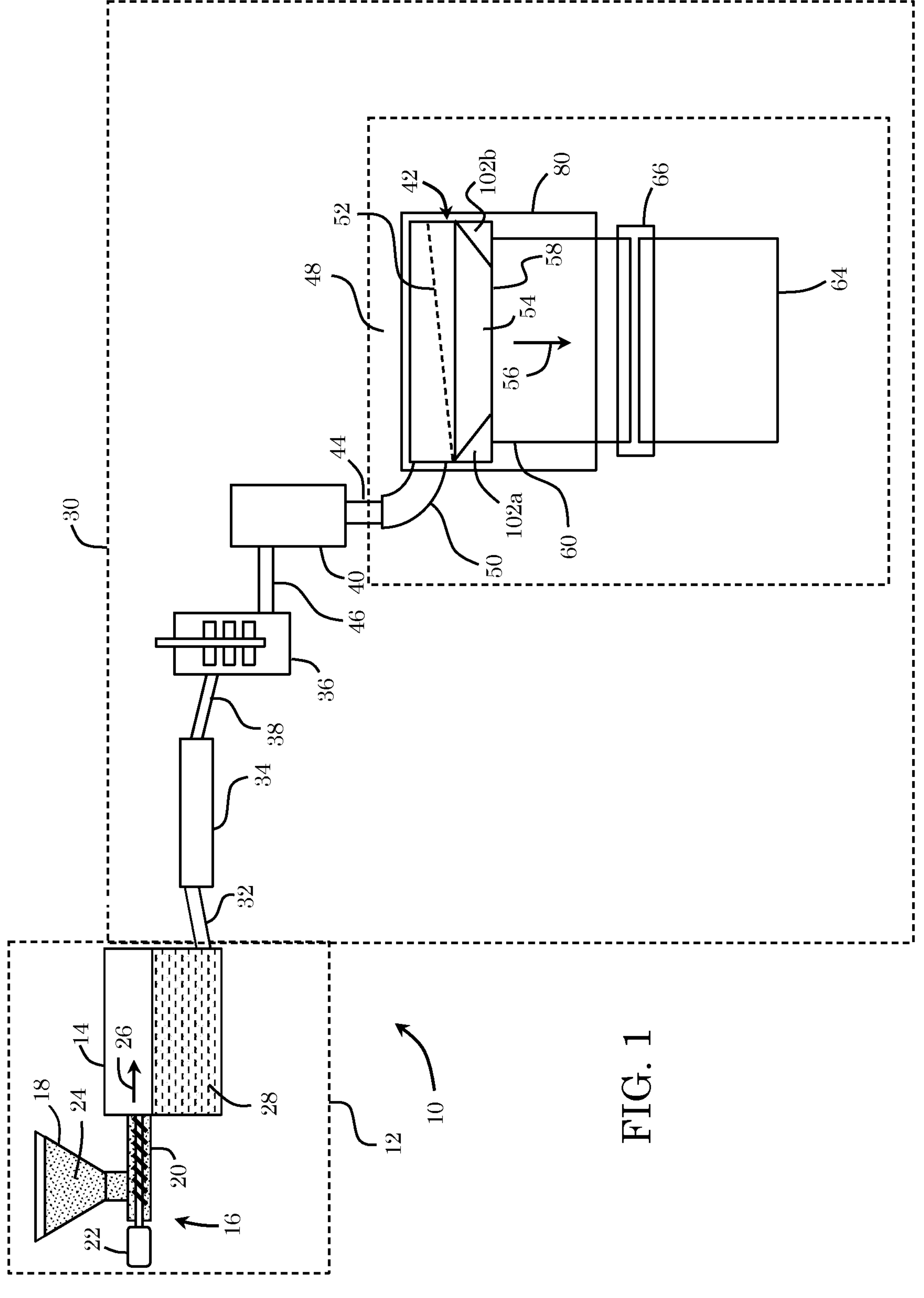
FIG. 1 is a schematic view of an exemplary glass manufacturing apparatus according to the present disclosure.

Reference will now be made in detail to embodiments of the present disclosure, examples of which are illustrated in the accompanying drawings. Whenever possible, the same reference numerals will be used throughout the drawings to refer to the same or like parts. However, this disclosure can be embodied in many different forms and should not be construed as limited to the embodiments set forth herein.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Ranges can be expressed herein as from "about" one particular value, and/or to "about" another particular value. When such a range is expressed, another embodiment includes from the one particular value to the other particular value. Similarly, when values are expressed as approximations by use of the antecedent "about," it will be understood that the particular value forms another embodiment. It will be further understood that the endpoints of each of the ranges are significant both in relation to the other endpoint, and independently of the other endpoint.

Directional terms as used herein—for example, up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus, specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an," and "the" include plural references unless the context clearly dictates otherwise. Thus, for example, reference to "a" component includes aspects having two or more such components, unless the context clearly indicates otherwise.

The word "exemplary," "example," or various forms thereof are used herein to mean serving as an example, instance, or illustration. Any aspect or design described herein as "exemplary" or as an "example" should not be construed as preferred or advantageous over other aspects or designs. Furthermore, examples are provided solely for purposes of clarity and understanding and are not meant to limit or restrict the disclosed subject matter or relevant portions of this disclosure in any manner. It can be appreciated that a myriad of additional or alternate examples of varying scope could have been presented but have been omitted for purposes of brevity.

As used herein, the terms "comprising" and "including," and variations thereof, shall be construed as synonymous and open-ended, unless otherwise indicated. A list of elements following the transitional phrases comprising or including is a non-exclusive list, such that elements in addition to those specifically recited in the list may also be present.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein a refractory material is a non-metallic inorganic material that is polycrystalline, polyphasic, inorganic, porous, heterogeneous, and suitable as a component of an apparatus or system exposed to temperatures in excess of 538° C. For example, refractory materials may include but are not limited to oxides of aluminum, silicon, magnesium, calcium, yttrium, and zirconium. Refractory materials may include a binder material.

As used herein an electrical bus (e.g., bus bar, bus bar section, bus bar segment, etc.) refers to a solid, rigid metal member designed to carry an electrical current between an electrical power supply and a load. In contrast, a cable designed to carry an electrical current of the magnitudes described herein comprises a plurality of wound (e.g., helically wound) metal conductors (wires) contained within an electrically isolating jacket material.

Shown in FIG. 1 is an exemplary glass manufacturing apparatus 10. Glass manufacturing apparatus 10 comprises a glass melting furnace 12 including a melting vessel 14. In addition to melting vessel 14, glass melting furnace 12 may optionally include one or more additional components such as heating elements (e.g., combustion burners and/or electrodes) configured to heat raw material and convert the raw material into a molten material, hereinafter, molten glass. For example, melting vessel 14 may be an electrically-boosted melting vessel, wherein energy is added to the raw material through both combustion burners and by direct heating, wherein an electrical current is passed through the raw material, the electrical current thereby adding energy via Joule heating of the raw material.

Glass melting furnace 12 may include other thermal management devices (e.g., thermal insulation components) that reduce heat loss from the melting vessel. Glass melting furnace 12 may include electronic and/or electromechanical devices that facilitate melting of the raw material into a glass melt. Glass melting furnace 12 may include support structures (e.g., support chassis, support member, etc.) or other components.

Melting vessel 14 can be formed from a refractory material, for example a refractory ceramic material comprising alumina or zirconia, although the refractory ceramic material can comprise other refractory materials, such as yttrium (e.g., yttria, yttria-stabilized zirconia, yttrium phosphate), zircon ($ZrSiO_4$) or alumina-zirconia-silica or even chrome oxide, used either alternatively or in any combination. In some examples, melting vessel 14 may be constructed from refractory ceramic bricks.

Glass melting furnace 12 may be incorporated as a component of a glass manufacturing apparatus configured to fabricate a glass article, for example a glass ribbon, although the glass manufacturing apparatus can be configured to form other glass articles without limitation, such as glass rods, glass tubes, glass envelopes (for example, glass envelopes for lighting devices, e.g., light bulbs), and glass lenses. In some examples, glass melting furnace 12 may be included in a glass manufacturing apparatus comprising a slot draw apparatus, a float bath apparatus, a down-draw apparatus (e.g., a fusion down-draw apparatus), an up-draw apparatus, a pressing apparatus, a rolling apparatus, a tube drawing apparatus or any other glass manufacturing apparatus that would benefit from the present disclosure. By way of example, FIG. 1 schematically illustrates glass melting furnace 12 as a component of a fusion down-draw glass manufacturing apparatus 10 for fusion drawing a glass ribbon for subsequent processing into individual glass sheets or rolling the glass ribbon onto a spool. As used herein, fusion drawing comprises flowing molten glass over inclined, e.g., converging, side surfaces of a forming body, wherein the resulting streams of molten material join, or "fuse," at the bottom of the forming body to form a glass ribbon.

Glass manufacturing apparatus 10 may optionally include an upstream glass manufacturing apparatus 16 positioned upstream of melting vessel 14. In some examples, a portion of, or the entire upstream glass manufacturing apparatus 16, can be incorporated as part of the glass melting furnace 12.

As shown in FIG. 1, upstream glass manufacturing apparatus 16 may include a raw material storage bin 18, a raw material delivery device 20, and a motor 22 connected to raw material delivery device 20. Raw material storage bin 18 may be configured to store raw material 24 that can be fed into melting vessel 14 of glass melting furnace 12 through one or more feed ports, as indicated by arrow 26. Raw material 24 typically comprises one or more glass forming metal oxides and one or more modifying agents. In some examples, raw material delivery device 20 may be powered by motor 22 to deliver a predetermined amount of raw material 24 from raw material storage bin 18 to melting vessel 14. In further examples, motor 22 may power raw material delivery device 20 to introduce raw material 24 at a controlled rate based on a level of molten glass sensed downstream from melting vessel 14 relative to a flow direction of the molten glass. Raw material 24 within melting vessel 14 can thereafter be heated to form molten glass 28. Typically, the raw material is added to the melting vessel as particulate, for example as various "sands." Raw material 24 may also include scrap glass (i.e., cullet) from previous melting and/or forming operations. Combustion burners may be used to begin the melting process. In an electrically boosted melting process, once the electrical resistance of the raw material is sufficiently reduced by the combustion burners, electric boost can begin by developing an electrical potential between electrodes positioned in contact with the raw material, thereby establishing an electrical current through the raw material, the raw material typically entering, or in, a molten state.

Glass manufacturing apparatus 10 may also include a downstream glass manufacturing apparatus 30 positioned downstream of glass melting furnace 12 relative to a flow direction of molten glass 28. In some examples, a portion of downstream glass manufacturing apparatus 30 may be incorporated as part of glass melting furnace 12. For instance, first connecting conduit 32 discussed below, or other portions of the downstream glass manufacturing apparatus 30, may be incorporated as part of the glass melting furnace 12.

Downstream glass manufacturing apparatus 30 may include a first conditioning chamber, such as fining vessel 34, located downstream from melting vessel 14 and coupled to melting vessel 14 by way of the above-referenced first connecting conduit 32. In some examples, molten glass 28 may be gravity fed from melting vessel 14 to fining vessel 34 by way of first connecting conduit 32. Accordingly, first connecting conduit 32 provides a flow path for molten glass 28 from melting vessel 14 to fining vessel 34. However, other conditioning chambers may be positioned downstream of melting vessel 14, for example between melting vessel 14 and fining vessel 34. In some embodiments, a conditioning chamber may be employed between the melting vessel and the fining chamber. For example, molten glass from a primary melting vessel can be further heated in a secondary melting (conditioning) vessel or cooled in the secondary melting vessel to a temperature lower than the temperature of the molten glass in the primary melting vessel before entering the fining chamber.

Bubbles may be removed from molten glass 28 by various techniques. For example, raw material 24 may include multivalent compounds (i.e., fining agents) such as tin oxide that, when heated, undergo a chemical reduction reaction and release oxygen. Other suitable fining agents can include without limitation arsenic, antimony, iron, and/or cerium, although the use of arsenic and antimony, owing to their toxicity, may be discouraged for environmental reasons in some applications. Fining vessel 34 is heated, for example to a temperature greater than the melting vessel interior temperature, thereby heating the fining agent to a sufficient reaction temperature for chemical reduction. Oxygen produced by the temperature-induced chemical reduction of one or more fining agents included in the molten glass can diffuse into gas bubbles produced during the melting process. The enlarged gas bubbles with increased buoyancy then rise to a free surface of the molten glass within the fining vessel and are thereafter vented from the fining vessel, for example through a vent tube in fluid communication with the atmosphere above the free surface.

Downstream glass manufacturing apparatus 30 may further include another conditioning chamber, such as mixing apparatus 36, for example a stirring vessel, for mixing the molten glass that flows downstream from fining vessel 34. Mixing apparatus 36 can be used to provide a homogenous glass melt composition, thereby reducing chemical and/or thermal inhomogeneities that may otherwise exist within the molten glass exiting the fining vessel. As shown, fining vessel 34 may be coupled to mixing apparatus 36 by way of a second connecting conduit 38. Accordingly, molten glass 28 can be gravity fed from the fining vessel 34 to mixing apparatus 36 through second connecting conduit 38. Typically, the molten glass within mixing apparatus 36 includes a free surface, with a free (e.g., gaseous) volume extending between the free surface and a top of the mixing apparatus. While mixing apparatus 36 is shown downstream of fining vessel 34 relative to a flow direction of molten glass 28, mixing apparatus 36 may be positioned upstream from fining vessel 34 in other embodiments. Downstream glass manufacturing apparatus 30 may include multiple mixing apparatus, for example a mixing apparatus upstream from fining vessel 34 and a mixing apparatus downstream from fining vessel 34. When used, multiple mixing apparatus may be of the same design, or they may be of a different design from one another. One or more of the vessels and/or conduits disclosed herein may include static mixing vanes positioned therein to further promote mixing and subsequent homogenization of the molten material.

Downstream glass manufacturing apparatus 30 may further include another conditioning chamber such as delivery vessel 40 located downstream from mixing apparatus 36. Delivery vessel 40 can act as an accumulator and/or flow controller to provide a consistent flow of molten glass 28 to forming body 42 by way of exit conduit 44. The molten glass within delivery vessel 40 can, in some embodiments, include a free surface, wherein a free volume extends upward from the free surface to a top of the delivery vessel. As shown, mixing apparatus 36 can be coupled to delivery vessel 40 by way of third connecting conduit 46, wherein molten glass 28 can be gravity fed from mixing apparatus 36 to delivery vessel 40 through third connecting conduit 46.

Downstream glass manufacturing apparatus 30 may further include forming apparatus 48 configured to form a glass article, for example glass ribbons. Accordingly, forming apparatus 48 may comprise a down-draw apparatus, such as an overflow down-draw apparatus, wherein exit conduit 44 is positioned to deliver molten glass 28 from delivery vessel 40 to inlet conduit 50 of forming body 42. The forming body in a fusion down-draw glass manufacturing apparatus can comprise a trough 52 positioned in an upper surface of the forming body, and opposing converging forming surfaces 54 that converge in a draw direction 56 along a bottom edge (root) 58 of the forming body. Molten glass delivered to forming body trough 52 via delivery vessel 40, exit conduit 44, and inlet conduit 50 overflows the walls of trough 52 and descends along the converging forming surfaces 54 as separate flows of molten glass. The separate flows of molten glass join below and along the root 58 to produce a ribbon of molten glass that is drawn in draw direction 56 from root 58 by applying a downward tension to the molten glass ribbon, such as by gravity and opposing, counter-rotating pulling rolls 62. The applied downward tension, and the temperature of the molten glass, can be used to control dimensions of the glass ribbon as the molten glass cools and a viscosity of the molten glass increases. Accordingly, the molten glass ribbon goes through a viscosity transition, from a viscous state, to a viscoelastic state, to an elastic state and acquires mechanical properties that give glass ribbon 60 stable dimensional characteristics. Glass ribbon 60 may then be scored, then divided into shorter lengths, such as into glass sheets 64. Alternatively, glass ribbon 60 may be spooled. Glass ribbon scoring apparatus 66 may include a scoring tool 68, a backing bar 70 (e.g., anvil) positioned opposite the scoring tool on an opposite side of the glass ribbon, and one or more nosing members 72 that can be applied to the surface of the glass ribbon to control movement of the glass ribbon during the scoring operation. Glass ribbon scoring apparatus 66 may comprise a gantry (not shown) capable of vertical movement along the draw direction at the draw speed. Glass sheets may be removed from the glass ribbon by a robot 74. For example, robot 74 may bend the glass ribbon at the score, causing the glass ribbon to separate along the score and form a glass sheet.

Components of downstream glass manufacturing apparatus 30, including any one or more of connecting conduits 32, 38, 46, fining vessel 34, mixing apparatus 36, delivery vessel 40, exit conduit 44, or inlet conduit 50 may be formed from a precious metal. Suitable precious metals include platinum group metals selected from the group consisting of platinum, iridium, rhodium, osmium, ruthenium and palladium, or alloys thereof. For example, downstream components of the glass manufacturing apparatus may be formed from a platinum-rhodium alloy including from about 70% to about 90% by weight platinum and about 10% to about 30% by weight rhodium.

Forming apparatus 48 may further include an enclosure 80, wherein forming body 42 is disposed within the enclosure. Enclosure 80 is configured to help maintain a controlled thermal environment for the glass ribbon as the glass ribbon goes through a viscosity transition. Enclosure 80 may be a single enclosure or comprise several portions. For example, enclosure 80 may include an upper portion housing forming body 42, and one or more lower portions. Doors and/or gates, often horizontally slidable (not shown), may be provided between the upper portion and the lower portion(s) to reduce cooling of the environment in the upper portion for example from upward drafts produced by heated air (e.g., chimney effect) or cooler downstream equipment.

Enclosure 80 may be formed of a refractory material, such as silicon carbide, alumina, and zircon, but may comprise, either additionally or alternatively, metal components, e.g., various steel beams, trusses, wall panels, and the like, and refractory insulating panels configured to further control the thermal environment within the enclosure. Enclosure 80 may further include a plurality of thermal elements 82, for example heating and/or cooling elements, arranged within the enclosure, for example along the walls of the enclosure, to heat the forming body and the molten glass therein, and to cool the glass ribbon drawn from the forming body. The heating elements may be electrical resistance heating elements in the form of coils and/or bars (rods). Cooling elements may comprise cooling tubes through which a cooling fluid is flowed. The glass article formed by forming body 42 (e.g., glass ribbon) is drawn downward through enclosure 80 and conditioned by a predetermined and carefully controlled temperature profile produced by the plurality of thermal elements, the temperature profile selected to reduce residual stress in the glass ribbon that can influence the shape of the glass ribbon.

As molten glass 28 flows over converging forming surfaces 54, and descends from root 58 of forming body 42, the molten glass contracts laterally, in a direction orthogonal to draw direction 56. This lateral contraction reduces the width of the glass ribbon drawn from forming body 42. To mitigate lateral contraction, a first edge director assembly **100*a* is attached to forming body 42 at a first end of the forming body and a second edge director assembly 100*b* is attached to forming body 42 at a second end of forming body 42. Edge director assemblies 100*a*, 100*b* increase the surface area of converging forming surfaces 54 and effectively extend the length of root 58, thereby countering lateral contraction. Edge director assemblies 100*a*, 100*b* each comprise a pair of plow share-shaped members extending along at least a portion of the length of the forming body. Each edge director assembly 100*a*, 100*b* comprises two opposing edge directors positioned on opposite sides of the forming body, for a total of two edge director assemblies and four edge directors. Pairs of opposing edge directors on opposite sides of the forming body at an end of the forming body are attached together to form an edge director assembly. Thus, one edge director assembly 100*a* is positioned at the inlet end of the forming body (where molten glass enters the forming body from inlet conduit 50), and a second edge director assembly 100*b* is positioned at the opposite end of the forming body. The following provides a description of a single edge director assembly 100*a* located at a first end of forming body 42**, with the understanding that a second edge director assembly positioned at the opposing second end of the forming body may be substantially similar to the first edge director assembly.

Figure 2:
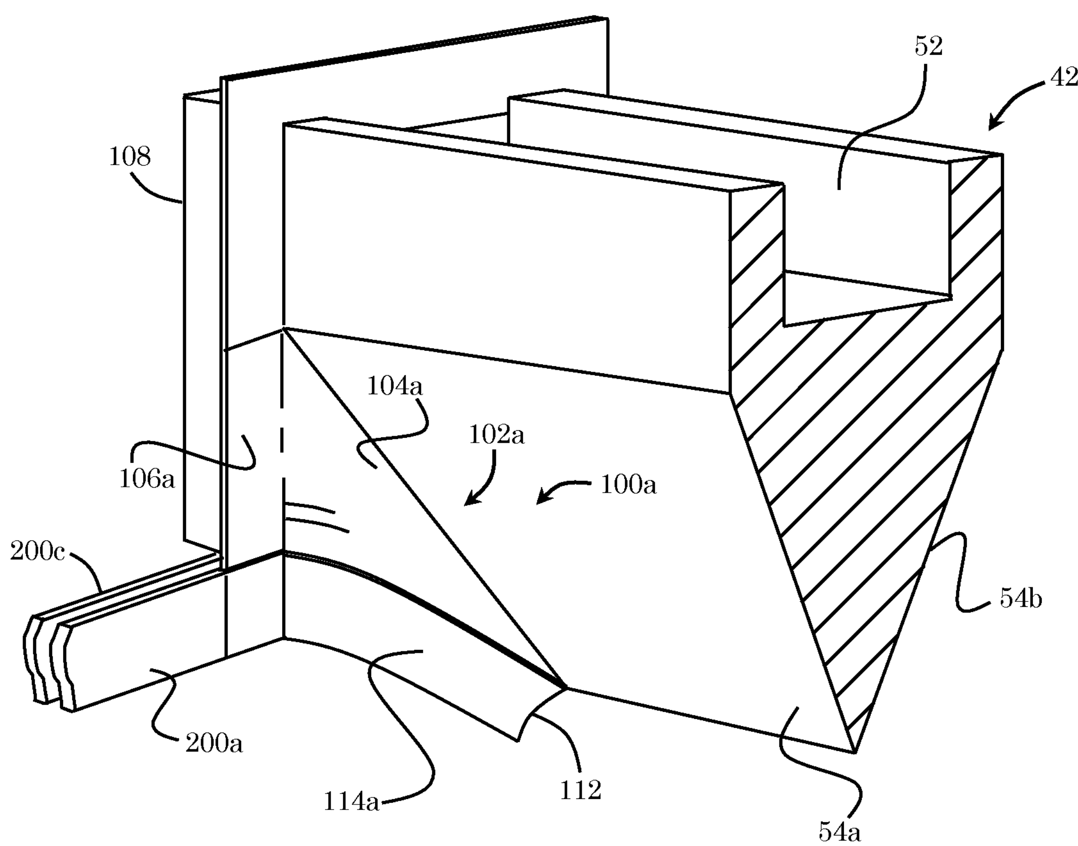
FIG. 2 is a perspective view of a cross section of an exemplary forming body showing a portion of an edge director assembly and bus bar assemblies.
Figure 3:
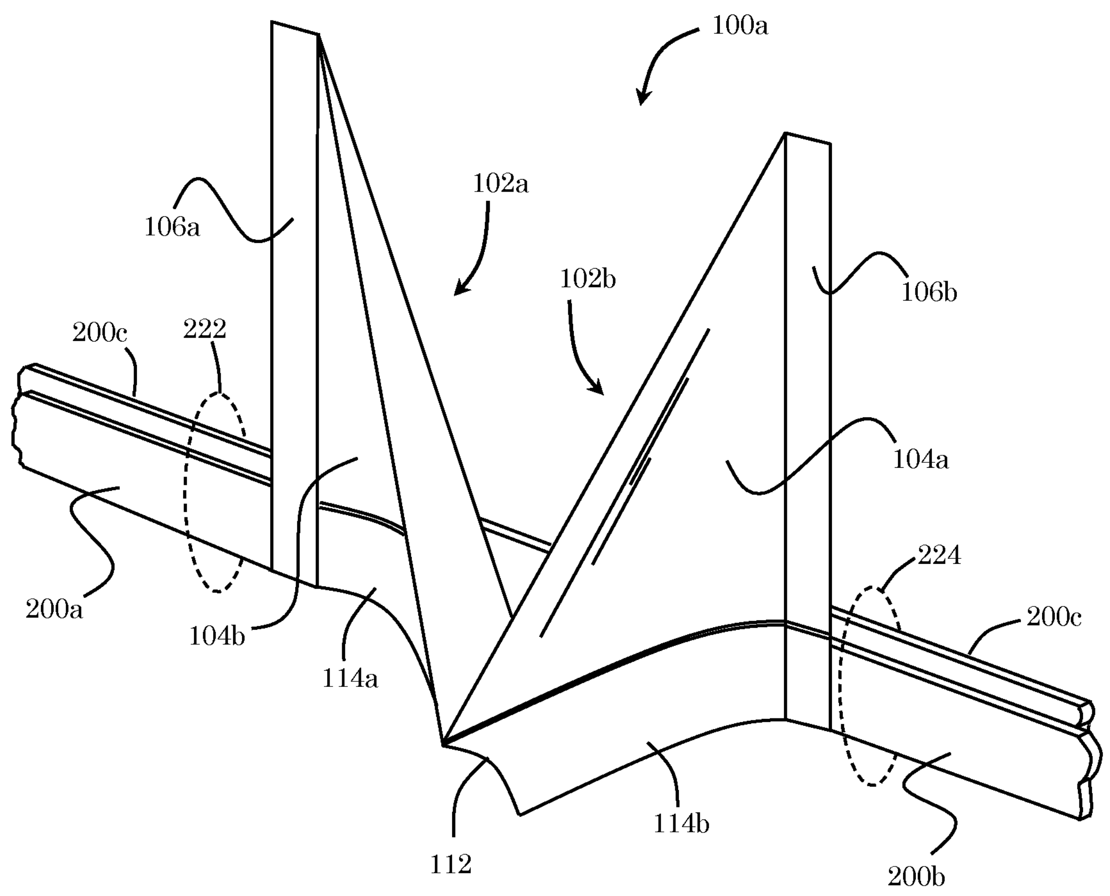
FIG. 3 is a perspective view of an exemplary edge director assembly and bus bar assemblies, shown without the forming body.

FIG. 2 is a perspective view of one end of forming body 42 (e.g., inlet end) depicting first edge director assembly **100*a* (only a single edge director of the edge director assembly shown), while FIG. 3 is a perspective view of edge director assembly 100*a* showing a pair of opposing edge directors but with the forming body removed for clarity. To wit, edge director assembly 100***a* comprises a first edge director 102*a* positioned against first converging forming surface 54*a* and a second edge director 102*b* positioned against second converging forming surface 54*b*. First edge director 102*a* is in contact with first converging forming surface 54*a* and comprises a first curved outward-facing surface 104*a*, while second edge director 102*b* is in contact with second converging forming surface 54*b* and comprises a second curved, outward-facing surface 104*b*. First and second edge directors 102*a*, 102*b* may further include dams 106*a*, 106*b*, respectively, that extend at approximately 90 degrees relative to forming body 42 (e.g., the converging forming surfaces 54). Dams 106*a*, 106*b* prevent overflow of molten glass beyond the edge director assembly. As shown in FIG. 2, dams 106*a*, 106*b* may form part of an end cap 108 positioned over the inlet end of forming body 42.

First and second curved outward-facing surfaces 104*a*, 104*b* may, for example, be frustoconical surfaces. Edges of opposing first and second edge directors 102*a*, 102*b* that face inward, toward the middle of the forming body, are joined, for example by welding, thereby forming a joined edge 112 positioned below root 58. First and second bottom edge portions 114*a*, 114*b* of first and second edge directors 102*a*, 102*b* may be thickened, for example by laminating (e.g., welding) additional material to the edge directors so a bottom edge portion of each edge director is thicker than the remaining upper portion of each respective edge director. Joined edge 112 may include first and second thickened bottom edge portions 114*a*, 114*b*. That is, joined edge 112 may be formed by the intersection of the thickened bottom edge portions of the respective edge directors.

As molten glass flows down forming body 42 and over the outward-facing surfaces 104*a*, 104*b* of first and second edge directors 102*a*, 102*b*, the temperature of the molten glass decreases and the viscosity increases. All glasses are unstable with respect to one or more crystalline compounds. Given an appropriate temperature transition, glass will crystalize. Nucleation and crystal growth are required. The kinetics of nucleation involve the free energy of formation of a small region of the glass and the transport of atoms to and from that region. Beyond some critical size, interfacial energy becomes unimportant and crystal growth may proceed by an interfacial diffusion process. The kinetics of both parts of this process depend on the extent of undercooling ($T_L$-T), where $T_L$ represents the liquidus temperature of the molten glass and T is the present molten glass temperature. Liquidus temperature is that temperature above which the melt remains liquid and represents the maximum temperature at which crystals can coexist with the melt. In both cases the competing nature of a thermodynamic driving force that increases with increasing undercooling and a diffusion term that decreases with increasing undercooling lead to maximum nucleation and crystal growth rates at temperature below $T_L$. If the temperature of the molten glass falls below the liquidus temperature of the material, and the molten glass is resident at that temperature for a sufficient time, crystallization may occur.

The accidental or uncontrolled formation of crystals in glass is known as devitrification, and the crystal growth is often termed "devit." Devit can be detrimental to the optical and mechanical properties of glass. In some glasses, the nucleation and crystal growth rate curves may very nearly coincide, resulting in homogeneous nucleation and crystal growth over a broad temperature range. In more stable glasses, the combination of high viscosity and low diffusion coefficient at the liquidus temperature eliminates concern for homogeneous nucleation. Heterogeneous nucleation, however, may occur at surfaces where impurity particles or other discontinuities exist. Accordingly, a combination of long residence time at the molten glass-edge director interface and temperatures that may fall below the liquidus temperature of the molten glass may cause devit to accumulate on the edge directors, and most particularly along the lower (e.g., bottom) edges of the edge directors and lower portions of the dams. Heating devit to a temperature above the liquidus temperature can drive devit back into solution in the molten glass and/or prevent it from forming.

Thermal elements 82, for example resistive heating elements, can be positioned near forming body root 58 along a middle portion of forming body 42 and arranged to heat root 58 of forming body 42. Such heating elements have been shown to be effective to prevent devit along the root. However, edge director assemblies are positioned near the coldest portions of the forming body, at the ends of the forming body nearest the end walls of enclosure 80, and while various heating apparatus have been used to heat the edge directors via radiative heating, such heating apparatus have limitations, not least of which is the concentration of other forming equipment near the ends of the forming body that can interfere with effective placement and radiative effects of the heating elements. These other apparatus make directing heat to edge directors, and particularly to the lower edges of the edge directors most prone to the formation of devit, difficult and not wholly effective at preventing devit. Devit can cause defects in the glass ribbon and disrupt stable ribbon edge (bead) development. Devit can also interfere with lateral contraction mitigation, thereby resulting in an increase in attenuation of the ribbon and a reduction in useable ribbon width. Additionally, if crystal growth is allowed to continue, pieces of devit can break off from the edge directors and become entrained in the glass ribbon, forming a defect therein.

To overcome the imitations posed by radiative heating of the edge directors, bus bar assemblies are attached to the edge director assembly, the bus bar assemblies configured to direct an electrical current through the edge director assembly, and particularly through the thickened bottom edge portions. A first bus bar assembly 200*a* is attached to a first thickened bottom edge portion 114*a* of first edge director 102*a* and a second bus bar assembly 200*b* is attached to a second thickened bottom edge portion 114*b* of second edge director 102*b*. A third bus bar assembly 200*c* is attached at joined edge 112 (e.g., a back side of joined edge 112) between first and second edge directors 102*a*, 102*b*, and more particularly at the intersection of the two opposing thickened bottom edge portions 114*a*, 114*b*.

Figure 4:
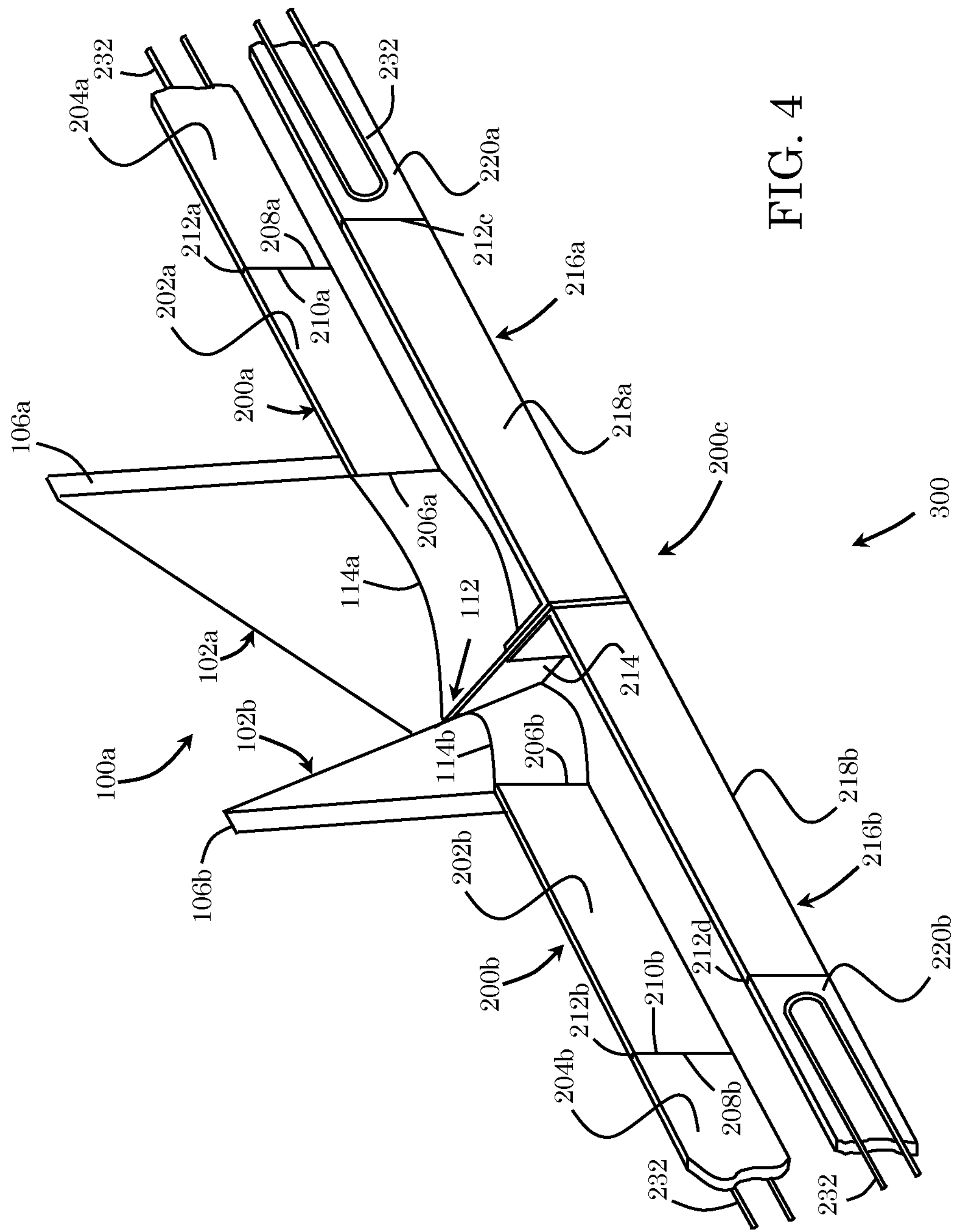
FIG. 4 is another perspective view of an exemplary edge director assembly and bus bar assemblies showing cooling devices attached to the bus bar assemblies.

A best seen in FIG. 4, first bus bar assembly 200*a* comprises a first bus bar 202*a* formed of a first metal and a second bus bar 204*a* formed of a second metal. A first end 206*a* of first bus bar 202*a* may be joined to first thickened bottom edge portion 114*a* of first edge director 102*a*, such as by welding. First bus bar 202*a* may be formed of the same metal as first edge director 102*a*. For example, the first metal may comprise platinum. The first metal may be formed from a platinum alloy such as a platinum-rhodium alloy including from about 70% to about 90% by weight platinum and about 10% to about 30% by weight rhodium. However, other platinum group metals, for example ruthenium, palladium, osmium, iridium, or alloys thereof (for example alloyed with either one or both of platinum or rhodium, may be used alternatively or in addition. Other high temperature metals that may be useful in such applications may include molybdenum, titanium, tungsten, or tantalum, typically as alloying metals. A second end 208*a* of first bus bar 202*a* may be joined to first end 210*a* of second bus bar 204*a*, such as by welding. Second bus bar 204*a*, being spaced apart from first edge director 102*a*, and, as described later, positioned wholly or predominately outside enclosure 80, may be formed from a second, less temperature resistant metal compared to first bus bar 202*a* (e.g., a different metal than the first metal), such as nickel, copper, silver, alloys thereof, or other metals suitable for the operating temperatures involved and the current carrying capacity expected. Unless otherwise indicated, first metal and second metal as used herein refer at least to the first and second metals described in respect of first bus bar 202*a* and second bus bar 204*a*. The joining of first bus bar 202*a* with second bus bar 204*a* forms a first boundary 212*a* between first bus bar 202*a* and second bus bar 204*a*, e.g., between the first metal and the second metal of first bus bar assembly 200*a*.

Similarly, second bus bar assembly 200*b* comprises a third bus bar 202*b* formed from the first metal and a fourth bus bar 204*b* formed from the second metal and arranged similarly to first bus bar assembly 200*a*. A first end 206*b* of third bus bar 202*b* is joined to second edge director 102*b*, for example to second thickened bottom edge portion 114*b*, and second end 208*b* of third bus bar 202*b* is joined to first end 210*b* of fourth bus bar 204*b*. The joining of third bus bar 202*b* with fourth bus bar 204*b* forms a second boundary 212*b* between third bus bar 202*b* and fourth bus bar 204*b*, e.g., between the first metal of third bus bar 202*b* and the second metal of fourth bus bar 204*b*. Third bus bar 202*b* may be formed from the same metal as second edge director 102*b*, e.g., the same first metal as first bus bar 202*a*, while fourth bus bar 204*b*, being spaced apart from the second edge director 102*b*, may be formed from the same second metal as second bus bar 204*a*.

Third bus bar assembly 200*c* comprises a central bus bar 214 joined to joined edge 112 between first edge director 102*a* and second edge director 102*b* (e.g., the intersection of first and second thickened bottom edge portions 114*a*, 114*b*), such as by welding. A first branch bus bar 216*a* and a second branch bus bar 216*b* extend outward from central bus bar 214 and are joined thereto, such as by welding. For example, first branch bus bar 216*a* and second branch bus bar 216*b* may extend in opposite directions, such as orthogonal to central bus bar 214, although other angles are contemplated. To wit, first branch bus bar 216*a* may be arranged 180 degrees from second branch bus bar 216*b*. For example, central bus bar 214, first branch bus bar 216*a*, and second branch bus bar 216*b* may form a "T" shape. Central bus bar 214 may be formed from the first metal, e.g., the first metal of first bus bar 202*a*. First branch bus bar 216*a* may further comprise a first bus bar segment 218*a* and a second bus bar segment 220*a*, first bus bar segment 218*a* comprising the first metal and second bus bar segment 220*a* comprising the second metal. First bus bar segment 218*a* is joined to central bus bar 214 at one end and second bus bar segment 220*a* at an opposing end, such as by welding. The joining of first bus bar segment 218*a* with second bus bar segment 220*a* forms a third boundary 212*c* between first bus bar segment 218*a* and second bus bar segment 220*a*, e.g., between the first metal and the second metal.

Similarly, second branch bus bar 216*b* may comprise third bus bar segment 218*b* comprising the first metal and fourth bus bar segment 220*b* comprising the second metal, wherein third bus bar segment 218*b* is joined to central bus bar 214 at one end and fourth bus bar segment 220*b* at the opposing end, such as by welding. The joining of third bus bar segment 218*b* with fourth bus bar segment 220*b* forms a fourth boundary 212*d* between third bus bar segment 218*b* and fourth bus bar segment 220*b*, e.g., between the first metal and the second metal.

Accordingly, edge director assembly 100*a*, first bus bar assembly 200*a*, second bus bar assembly 200*b*, and third bus bar assembly 200*c* may be joined together, such as by welding, to form a unitary direct heating assembly 300 that is attached to forming body 42. While not shown in FIGS. 3 and 4, direct heating assembly 300 may include end cap 108.

Figure 5:
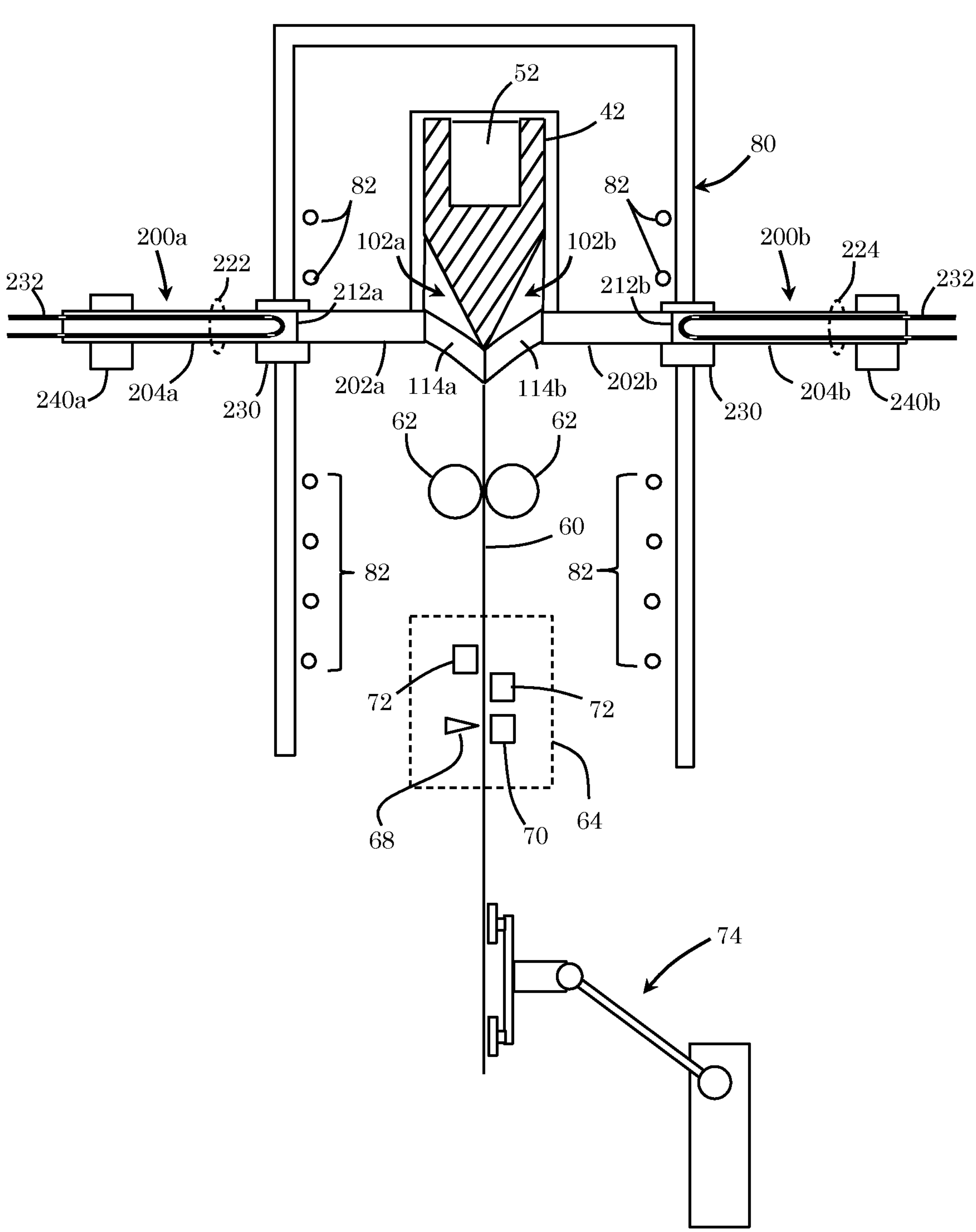
FIG. 5 is an elevational cross-sectional view of an exemplary forming apparatus showing an edge director assembly and bus bar assemblies.

Referring to FIG. 5, while forming body 42 and edge director assembly 100*a* (and edge director assembly 100*b*) are positioned within enclosure 80, first bus bar assembly 200*a*, second bus bar assembly 200*b*, and third bus bar assembly 200*c* may extend from edge director assembly 100*a* through openings in enclosure 80 and extend from inside the enclosure 80 to outside enclosure 80 to facilitate connection to an electrical power supply. That is, at least a portion of each of first bus bar assembly 200*a*, second bus bar assembly 200*b*, and third bus bar assembly 200*c* may extend through openings in enclosure 80 to an environment outside the enclosure. At least portions of first bus bar assembly 200*a* and first branch bus bar 216*a* of third bus bar assembly 200*c* may be arranged as a pair 222 of bus bars extending outward from forming body 42, e.g., orthogonal to the respective converging forming surface. Similarly, at least portions of second bus bar assembly 200*b* and second branch bus bar 216*b* of third bus bar assembly 200*c* may be arranged as a pair 224 of bus bars extending outward from forming body 42, for example in a direction opposite first bus bar assembly 200*a* and first branch bus bar 216*a*, e.g., orthogonal to the opposing converging forming surface. Thus, first bus bar pair 222 may extend from first edge director 102*a* (e.g., portions of first bus bar assembly 200*a* and first branch bus bar 216*a*) and a second bus bar pair 224 may extend from second edge director 102*b*. The openings through which the respective bus bar pairs extend are sized to allow movement of bus bar pairs 222, 224, for example along three orthogonal axes.

Temperature changes within enclosure 80, such as during heat up of the interior of enclosure 80, e.g., an upper portion of enclosure 80 and the forming body therein, may cause dimensional changes in forming body 42. To wit, the forming body may undergo thermal expansion and/or contraction as a consequence of temperature changes in the enclosure, either as a result of planned temperature changes (e.g., start-up or shut-down of the glass manufacturing process) or unplanned temperature changes (e.g., loss of electrical power). Because the edge director assemblies are attached to the forming body, and the respective edge directors may be joined together to form unitary structures, movement of the forming body, for example due to thermal expansion or contraction, will cause an associated movement of direct heating assembly 300, and more particularly the associated bus bar assemblies, relative to the enclosure. If the bus bar assemblies are constrained and not allowed to move with the forming body, stress may be imposed on the forming body, the edge director assemblies, and/or the bus bar assemblies. If the bus bar assemblies are unable to move with the forming body, any one or more of the edge director assemblies, the bus bar assemblies, or the forming body may be damaged. Accordingly, the opening through which the bus bar pairs extend may be filled with a deformable insulating material 230, e.g., a refractory insulating material that can accommodate movement of the bus bars. As used herein, a deformable insulating material is an insulating material that yields when pressed by the edge director assembly, but springs back into position when the pressure is relieved. For example, the deformable insulating material may comprise a refractory wool (e.g., a fibrous refractory material) inserted into the enclosure openings through which the bus bar assemblies extend and surrounding the bus bars in the openings, although other forms of refractory insulating material capable of deforming or otherwise accommodating horizontal and/or vertical movement of the bus bars about which the insulating material is disposed may be used.

Figure 6:
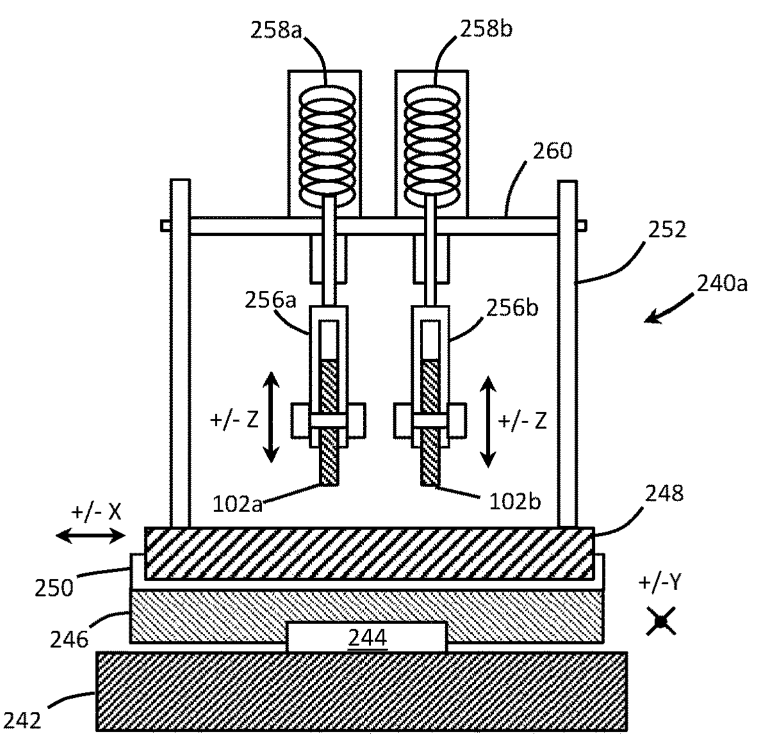
FIG. 6 is a cross-sectional view of a three-axis support assembly for supporting bus bar assemblies.

Additionally, each bus bar pair 222, 224 may be supported by a three-axis support assembly configured to accommodate movement of the edge director assemblies along any one of three mutually orthogonal axes. For example, first bus bar pair 222 may be supported by a first three-axis support assembly 240*a* and second bus pair 224 may be supported by a second three-axis support assembly 240*b*. FIG. 6 depicts first three-axis support assembly 240*a*, with the understanding that second three-axis support assembly 240*b* may be similar or identical to first three-axis support assembly 240*a*. Each three-axis support assembly may be configured to move along three mutually orthogonal axes (e.g., X, Y, and/or Z axes), the three-axis support assemblies coupling the bus bar assemblies to a suitable structural support such as the building steel and/or supporting steel structure for enclosure 80. For example, the three-axis support assemblies may comprise linear slides arranged with stages. The three axes of first and second three-axis support assemblies 240*a*, 240*b* may be arranged, for example, along two orthogonal horizontal axes (e.g., X and Y) and a vertical axis (Z) orthogonal to both the X axis and the Y axis. Referring to FIG. 6, first three-axis support assembly 240*a* may comprise a base 242, a first rail 244, a first stage 246 configured to slide along rail 244 in a first direction, e.g., in a direction into or out of the page of FIG. 6 as designated by the X with the dot at the crossing point, and further designated as the +/−Y direction. First three-axis support assembly 240*a* may further comprise a second stage 248 configured to slide along a second rail 250 in a second direction orthogonal to the first direction, and designated by the arrow labeled +/−X. First three-axis support assembly 240*a* may still further comprise a frame 252 coupled to second stage 248, frame 252 supporting a pair of spring-loaded cradles (e.g., yokes or other coupling devices) configured to engage with and support first bus bar pair 222 along a +/−Z-axis orthogonal to the +/−X and +/−Y axes. For example, as shown in FIG. 6, first cradle 256*a* of first three-axis support assembly 240*a* may support first bus bar assembly 200*a* and second cradle 256*b* may a portion of third bus bar assembly 200*c*. First and second cradles 256*a* and 256*b* may then be supported by first and second springs 258*a*, 258*b* used to support and offset the weight of the respective bus bars coupled to the cradles.

Figure 7:
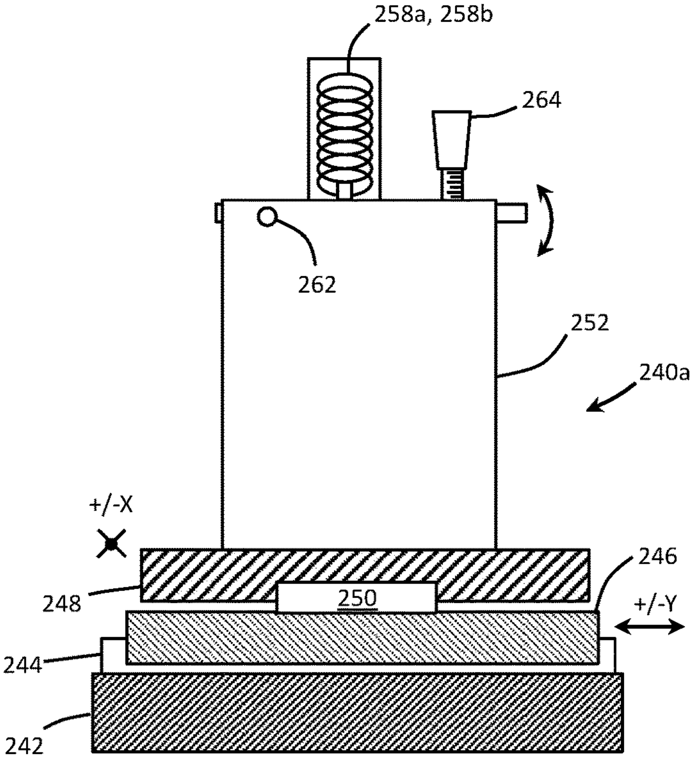
FIG. 7 is a partial cross-sectional view of the three-axis support assembly of FIG. 6.

First and second three-axis support assemblies 240*a*, 240*b* may include a tilt function. During operation it may be necessary from time to time to tilt forming body 42, e.g., to rotate the forming body about a lengthwise (longitudinal) axis thereof, to adjust the flow of molten glass over the opposing converging forming surfaces of the forming body. Since the edge director assemblies are attached to the forming body, and the bus bar assemblies extend outward from the forming body (for example, orthogonal to the longitudinal rotation axis of the forming body), the bus bar assemblies are necessarily tilted when the forming body is rotated. The three-axis support assemblies may be configured to accommodate the angle of tilt imposed by the forming body on the bus bar assemblies without imposing stress on the edge director assembly or the forming body. Thus, the three-axis support assemblies may be provided with a tilt function. For example, as shown in FIG. 7, first and second springs 258*a*, 258*b* of first three-axis support assembly 240*a* may be coupled to a platform 260 coupled to frame 252 by a hinged 262 to facilitate tilting of cradles 256*a*, 256*b*. However, other mechanisms for providing a tilt function may be used. First three-axis support assembly 240*a* may be provided with a threaded adjustment screw 264. The adjustment screw may be provided with a vernier scale to provide precise and repeatable tilt movements of platform 260 and cradles 256*a*, 256*b*. The bus bar assemblies are electrically isolated from their respective three-axis support assemblies. For example, cradles 256*a* and 256*b* may be formed from an electrical insulating material and/or include non-conducting material between the cradle and the respective bus bar(s).

As noted previously, enclosure 80 is a temperature-controlled enclosure provided with a plurality of thermal elements to maintain forming body 42, and the molten glass within, at a temperature commensurate with the desired forming viscosity of the molten glass. These temperatures can exceed 1000° C. in upper portions of the enclosure housing forming body 42. Accordingly, portions of the bus bar assemblies 200*a*, 200*b*, 200*c* exposed to such high temperatures may be formed from high temperature resistant materials, for example materials comprising platinum (e.g., platinum alloys such as platinum-rhodium). On the other hand, portions of the bus bar assemblies 200*a*, 200*b*, 200*c* disposed farther from such temperatures may be formed from materials that are less resistant to high temperatures (e.g., lower melting temperature), such as materials comprising nickel. To maintain these less temperature resistant components within a safe operating temperature range, these components may be actively cooled. Accordingly, second bus bar 204*a*, fourth bus bar 204*b*, second bus bar segment 220*a*, and fourth bus bar segment 220*b* may include cooling elements 232 coupled thereto. For example, such cooling elements 232 may comprise cooling tubes configured to convey a cooling fluid therethrough and reduce a temperature of the second bus bar 204*a*, fourth bus bar 204*b*, and second and fourth bus bar segments 220*a*, 220*b*. A suitable cooling fluid can be water, although other cooling fluids may be used. Cooling elements 232 may be clamped to the respective bus bar assemblies but are typically welded in place to obtain good thermal conduction between the cooling tubes and the respective bus bar assembly.

The bus bar assemblies may be arranged such that the second material comprising the bus bar assemblies (e.g., second bus bar 204*a*, fourth bus bar 204*b*, and first and second bus bar segments 218*a*, 220*a*) is not exposed to the high temperature environment within the forming enclosure. Because the molten glass flowing into and from forming body 42 is at an elevated temperature, constituents of the molten glass, for example boron, may vaporize from the molten glass into the surrounding environment, wherein the volatilized constituent may condense onto cool surfaces. To prevent condensation of volatilized materials on the bus bar assemblies, and particularly on the cooled portions of the bus bar assemblies, the bus bar assemblies may be arranged such that the boundary between the first material (e.g., platinum-containing material) and the cooled second material (e.g., nickel-containing material) of the bus bar assemblies is disposed outside the interior environments within the enclosure 80. For example, the boundary between the first material and the second material may be disposed within the insulating refractory material, e.g., the deformable refractory insulating material. Portions of the cooling tubes 232 may extend into the deformable insulating material but not be exposed within the enclosure.

As shown in FIGS. 3 and 4, first bus bar assembly 200*a* is joined to first thickened bottom edge portion 114*a* of the first edge director 102*a*, second bus bar assembly 200*b* is joined to the second thickened bottom edge portion 114*b* of second edge director 102*b*, and the third bus bar assembly 200*c* (e.g., central bus bar 214) is joined to first and second thickened bottom edge portions 114*a*, 114*b* of both first and second edge directors 102*a*, 102*b* where the two edge directors are joined together, i.e., joined edge 112. To wit, edge director assembly 100 is supplied with an electrical current through four electrical current paths, two electrical current paths comprising first and second bus bar assemblies 200*a*, 200*b*, and two current paths comprising first and second branch bus bars 216*a*, 216*b* of third bus bar assembly 200*c*.

First bus bar assembly 200*a* and second bus bar assembly 200*b* are electrically connected to an electrical power supply configured to supply first bus bar assembly 200*a* and second bus bar assembly 200*b*, and thus edge director assembly 100, with an electrical current. The electrical power supply supplies a three-phase electrical current, the three phases designated herein as phase A, phase B, and phase C. First bus bar assembly 200*a* is supplied with a first electrical current phase (e.g., phase A, B, or C), second bus bar assembly 200*b* is supplied with a second electrical current phase different than the first electrical current phase supplied to first bus bar assembly 200*a*, and third bus bar assembly 200*c* is supplied with the remaining electrical current phase different than the electrical current phases supplied to first bus bar assembly 200*a* and second bus bar assembly 200*b*. For the purpose of description and not limitation, the electrical current phase supplied to first bus bar assembly 200*a* is designated phase A, the electrical current phase supplied to second bus bar assembly 200*b* is designated phase C, and the electrical current phase supplied to third bus bar assembly 200*c* is designated phase B.

Phase A of electrical power supply 250 is supplied to second bus bar 204*a* of first bus bar assembly 200*a* via a first power cable 252 connected between electrical power supply 250 and second bus bar 204*a*. Phase C of electrical power supply 250 is supplied to fourth bus bar 204*b* via a second power cable 254 connected between electrical power supply 250 and fourth bus bar 204*b*. Phase B is attached to first branch bus bar 216*a* through third power cable 256 and also attached to second branch bus bar 216*b* via fourth power cable 258. For example, third power cable 256 may be connected to second bus bar segment 220*a* and fourth power cable 258 may be connected to fourth bus bar segment 220*b*.

When supplied with an electrical current, edge director assembly 100 is heated by Joule heating. Such a heating scheme is referred to as direct heating because the electrical current passing through the edge director assembly heats the edge director assembly itself, resistively, rather than through a scheme where the edge director is heated by radiation from one or more heating elements external to the edge director. That is, heating of the edge director assembly occurs as a result of an electrical current passing through the metal of the edge director and the electrical resistance of that metal. And, because first, second, and third bus bar assemblies 200*a*, 200*b*, and 200*c* are connected to first and second thickened bottom edge portions 114*a*, 114*b* of the edge director assembly, the bottom edge portions may be heated to a greater temperature than other portions of the edge director assembly, thereby directing heat to the area of the edge directors most likely to accumulate devit.

Figure 8:
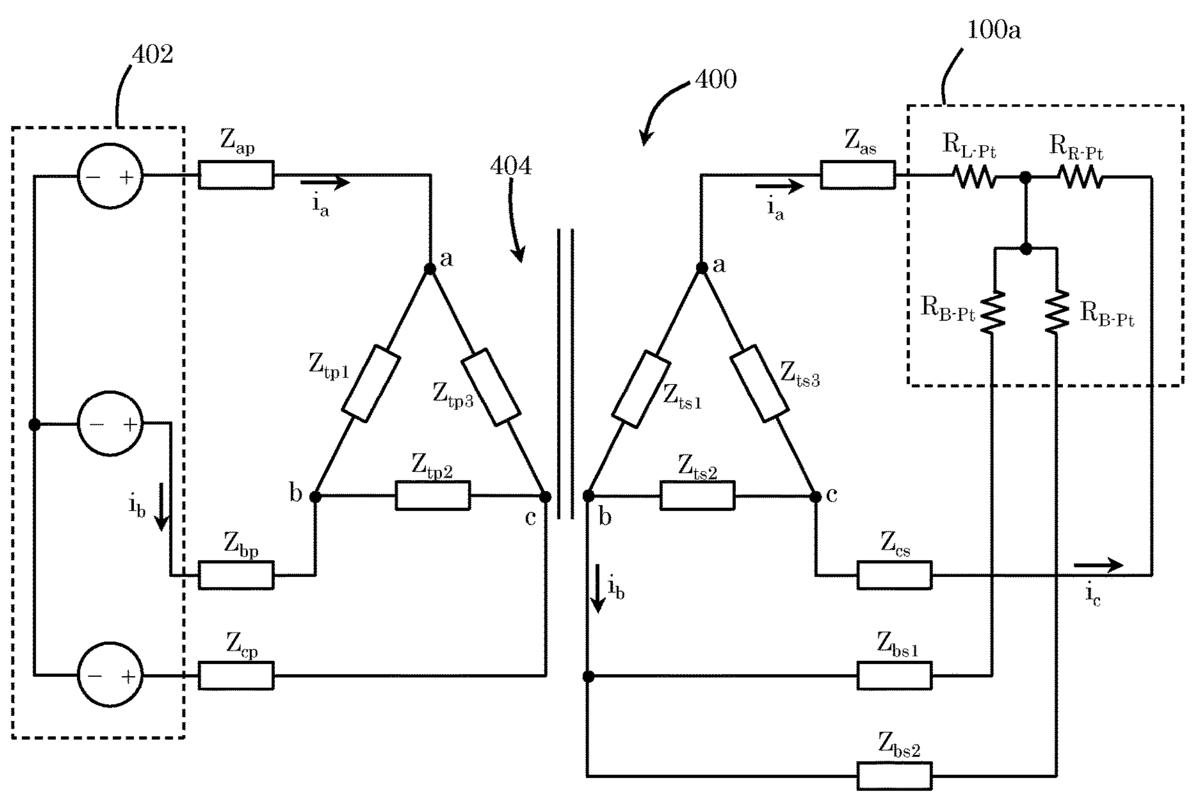
FIG. 8 is a schematic view of an exemplary power supply circuit for powering an edge director assembly.

Edge director assembly 100*a* may be supplied with alternating current (AC) from a suitable electrical power system, e.g., electrical power system 400. For example, the electrical power system may comprise a power supply 402 supplying the primary side of a transformer 404, e.g., a Δ:Δ (delta: delta) transformer. The secondary side of transformer 404 is connected to a floating Y load, e.g., edge director assembly 100*a* shown as electrical resistances, as illustrated in FIG. 8. Both the power supply and the load are electrically ungrounded.

The power system may employ a digital power supply 402, for example a Pacific Power Source AFX 3000 Series power supply. Digital power supplies can be capable of producing high power outputs with accurate waveforms and may comprise multiple parallel modules, each capable of producing, for example, a maximum rated three-phase or a single-phase current output over a wide range of voltages, for example over a range from about 5 volts to about 120 volts alternating current (Vac). For voltages between 120-300 Vac, the output may be current limited.

The power supply described herein can provide a sinusoidal output waveform. Additionally, the power supply may be capable of generating waveforms definable by a digital input file. The output frequency may be within a range from about 15 hertz (Hz) to about 1200 Hz with no voltage limitations, and up to about 3000 Hz with some voltage limitations.

Since the electrical power system may be operated as a 3-phase resistive heater, wherein the edge director assemblies themselves serve as heating elements, the real power dissipated on opposing sides (e.g., right and left edge directors) of an edge director assembly may be equal, or directly controlled. However, practical applications have shown the real power through the three bus bar assemblies is typically unequal. Assuming these loads are explicitly real, (e.g., $Z_{Pt}$=R+j0), then the electrical current conditions can be derived from the resistive form of Ohm's Law.

$$P_{L-Pt} = P_{R-Pt} \tag{1}$$

$$k^2 R_{L-Pt} i_a^2 = k_2 R_{R-Pt} i_c^2 \tag{2}$$

Figure 9:
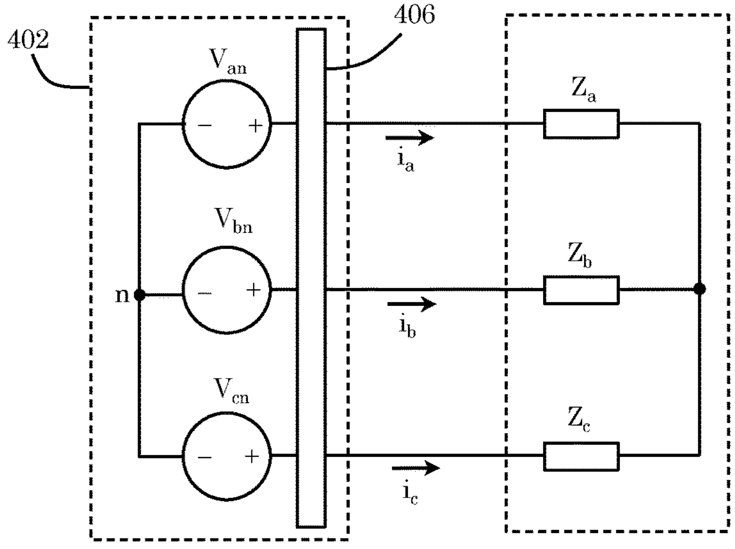
FIG. 9 is a simplified equivalent circuit of the circuit shown in FIG. 8.

If $R_{L-Pt}$=$R_{R-Pt}$, then $$i_a = i_c. \tag{3}$$

where the subscripts L-Pt and R-Pt refer to right and left edge directors of an edge director assembly, and $i_a$ and $i_c$ refer to the individual phase currents for phase A and phase C, respectively. This circuit can be simplified by reflecting the load impedance to the primary side of the transformers, as shown in FIG. 9. The phase impedances are represented by $Z_a$, $Z_b$, and $Z_c$.

Since the power system is assumed to be unbalanced, the electrical currents resulting from the input voltages may be found using mesh analysis. The phase currents $i_a$, $i_b$, and $i_c$ can be written in terms of the mesh currents $I_1$ and $I_2$ by applying Kirchoff's Current Law at node n (see FIG. 9).

$$i_a = I_1 \tag{4}$$

-continued $$i_b = I_2 - I_1 \quad (5)$$

$$i_c = -I_2 \quad (6)$$

Applying Kirchoff's Voltage Law to each loop in the mesh yields a matrix equation in terms of $I_1$ and $I_2$. Noting that $i_a=I_1$ and $i_c=-I_2$ are independent, the circuit can be designed such that the loads to be controlled are assigned to phase A and phase C, as in Equation 3, $$\begin{bmatrix} (Za+Zb) & -Zb \\ -Zb & (Zb+Zc) \end{bmatrix} \begin{bmatrix} I_1 \\ I_2 \end{bmatrix} = \begin{bmatrix} V_{an}-V_{bn} \\ V_{bn}-V_{cn} \end{bmatrix} \quad (7)$$

where Z is the impedance matrix defined by circuit elements such as the sources, lines, and loads, I is the vector of mesh currents, and V is the differential voltage between phases, i.e., $$ZI = V. \quad (8)$$

The variables Z, I, and V may be defined as phasor variables. For example, $$V_{an} = V_{an} \angle \varphi_{Van} \quad (9)$$

where $\varphi_{an}$ is phase angle and $V_{an}$ is the phasor magnitude. Substituting $i_a$ and $i_c$ in Equation 7 yields, $$\begin{bmatrix} (Z_a\angle\varphi_{Za}+Z_b\angle\varphi_{Zb}) & -Z_b\angle\varphi_{Zb} \\ -Z_b\angle\varphi_{zb} & (Z_b\angle\varphi_{Zb}+Z_c\angle\varphi_{Zc}) \end{bmatrix} \begin{bmatrix} i_a\angle\varphi_{ia} \\ -i_c\angle\varphi_{ic} \end{bmatrix} = \begin{bmatrix} V_{an}\angle\varphi_{Van}-V_{bn}\angle\varphi_{Vbn} \\ V_{bn}\angle\varphi_{Vbn}-V_{cn}\angle\varphi_{Vcn} \end{bmatrix} \quad (10)$$

In conventional 3-phase power systems, the voltage magnitudes and phase angles are fixed by the power source, typically a municipal utility, so the user can do little to alter them. In balanced three phase systems the voltage input, load impedance, and phase currents are all identical, making the analysis straightforward. However, in the present unbalanced system (where magnitude and phase angle may vary), because the digital power supply provides an ability to control phase voltage magnitudes $V_{an}$, $V_{bn}$, and $V_{en}$, and also phase angles $\varphi_{an}$, $\varphi_{bn}$, and $\varphi_{en}$, this becomes an undetermined problem with two equations and potentially six unknown variables.

If the voltage V and impedance Z matrices are fully defined, i.e., all magnitudes and phases are known, then the mesh currents $I_1$ and $I_2$ can be determined by, $$I = V/Z \quad (11)$$

Once the mesh currents are known, the phase currents $i_a$, $i_b$ and $i_c$ can be determined as well. Since voltage can be specified arbitrarily, a control system can be implemented that drives the phase currents to desired values by tuning the voltage input definition, resulting in variable amplitude three-phase sine wave control of the system independent of frequency.

Power supply 402 may include a controller 406, for example a proportional-integral (PI) controller. The control parameters may include a balance control parameter. The control parameters may include a bias control parameter. The control parameters may still further include a level control parameter. Each control parameter may be associated with an error function that is the difference between a user-defined setpoint and a present value of the respective control parameter. The respective error function can be used to adjust the value of a control parameter associated with that error function.

An exemplary controller 406 may be arranged as follows. For the following controller description, phase A will be used as the primary reference, with other phases controlled relative to phase A.

Referring to FIGS. 8-9, the objective of balance control is to manage the power balance between the right and left resistive loads $R_{R\text{-}Pt}$ and $R_{L\text{-}Pt}$ (e.g., the opposing edge directors of an edge director assembly), which implies $|i_a|=|i_c|$). Accordingly, a balance function $\Delta i_{bal}$ can be defined as the difference between the phase currents $i_a$ and $i_c$.

Given a user-defined balance control setpoint $\Delta i_{bal,setpt}$, an error function $\varepsilon_{bal}$ for electrical power balance can be defined as the difference between the balance control setpoint and the balance function $\Delta i_{bal}$.

Using a proportional-integral (PI) control scheme, an electrical power balance control parameter proportional to the error function $u_{bal}$ can be developed. For a relationship between mesh currents and phase currents, $I_1=i_a$ and $I_2=-i_c$, the electrical power balance control parameter $u_{bal}$ can be applied anti-symmetrically to the phase voltages.

A bias function $\Delta i_{bias}$ may be used to control the magnitude of phase current $i_b$ relative to phase current $i_a$. That is, the difference between the A and B phase currents.

Similar to development of the balance control, an error function $\varepsilon_{bias}$ can be introduced as the difference between a user-defined bias setpoint and the bias function (e.g., the A, B phase current difference). Again, using a proportional-integral (PI) control scheme, a bias control parameter $u_{bias}$ can be developed proportional to the balance error function and the bias function through a secondary gain function, $b_1$. Bias control can be applied in parallel with balance control.

Building on the balance and bias control, a level control parameter can be used to regulate the magnitude of current in phase A, $|i_a|$.

Development of the level control parameter proceeds similar to the balance and bias controls. Level control comprises regulating the magnitude of the current in phase A. Because the electrical power system is a three-phase continuous conduction system, changes to one phase affect the electrical power distribution in all phases. Here, the level error function $\varepsilon_{level}$ is the difference between the magnitude of the phase A current, $|i_a|$, and a user-defined level set-point $L_{setpt}$.

The associated PI level control parameter $u_{level}$ is then proportional to the level error function through a second secondary gain function $b_2$. In this case, the level control $u_{level}$ acts on all phases simultaneously and retains particular power ratios if the balance and bias control parameters have converged. Therefore, the level control parameter $u_{level}$ can be used to tune a master voltage gain parameter, $k_v$.

The electrical power supply used in the above-described system can be used to produce a steady state output response. The control schemes discussed herein are designed to drive the system toward a desired operating condition and maintain that condition in the presence of external perturbations. Dynamics associated with the power system may be handled internally within the electrical power supply, leaving only the input commands to the user. Since PI controllers provide only local stability, initial voltage conditions should be manually specified and reasonably close to a controlled equilibrium condition before engaging the controls.

The electrical power supply may include built-in functionality that can be utilized to accomplish this control scheme, or such functionality may be applied externally. In any event, control can be undertaken by a suitable controller, with the control parameters implemented through software. The PI controller may include, features, circuitry, logic, means, or instructions for controlling electrical current supplied to the bus bar assemblies via the balance, bias and level control parameters. The controller comprises a processor communicatively coupled to a non-transitory memory storing computer readable and executable instructions which, when executed by the processor, facilitate the operation of the electrical power supply.

Operating voltage and current limits can be specified for each phase of the power output. The primary control methodology may be determined by the proximity of the output to one of these limits. If an input phase voltage results in a current greater than the specified operating limit, that phase may be operated in a current control mode, whereby the phase voltage may be internally regulated to produce a specified limit current.

To accomplish this, the phase current limits may be defined explicitly before tuning of the controller begins. Then, a proportional control may be applied to each phase voltage until the current limit is reached. Once each phase has been driven to its current limit, new voltages can be assigned to the voltage set point variables. The controller will increase the voltages until the current limit is reached, and the power supply can automatically reduce the voltage if the resulting current exceeds the phase current limit.

Figure 10:
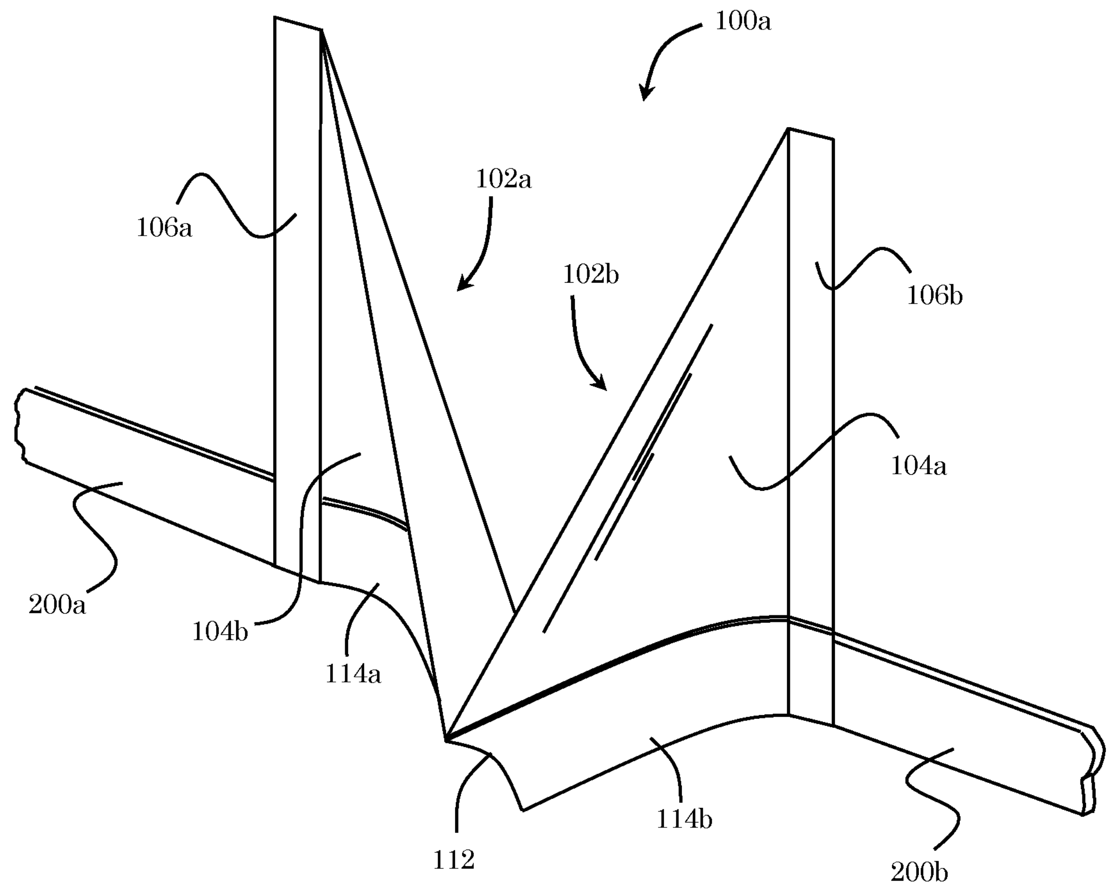
FIG. 10 is a perspective view of another exemplary edge director assembly and bus bar assemblies, shown without the forming body and configured to be heated by a single electrical phase.

While the foregoing disclosure emphasized a three-phase embodiment of a direct-heated edge director assembly, direct heating using a single electrical phase is also contemplated. For example, FIG. 10 illustrates an embodiment of edge director assembly 100*a* without a third bus bar assembly. Thus, a single-phase electrical current can be established between first bus bar assembly 200*a* and second bus bar assembly 200*b* through first and second edge directors 102*a* and 102*b*, and more particularly through first bottom edge portion 114*a* and second bottom edge portion 114*b*.

It will be apparent to those skilled in the art that various modifications and variations can be made to embodiments of the present disclosure without departing from the spirit and scope of the disclosure. Thus, it is intended that the present disclosure cover such modifications and variations provided they come within the scope of the appended claims and their equivalents.

What is claimed is:

1. A glass forming apparatus, comprising:

a forming body comprising a first converging forming surface and a second converging forming surface, the first and second converging forming surfaces joined along a bottom edge of the forming body;

an edge director assembly disposed at a first end of the forming body, the edge director assembly comprising a first edge director in contact with the first converging forming surface and a second edge director in contact with the second converging forming surface and joined to the first edge director along an edge portion joint;

a first bus bar assembly joined to the first edge director;

a second bus bar assembly joined to the second edge director;

a third bus bar assembly joined to the edge director assembly at the edge portion joint; and wherein the first, second, and third bus bar assemblies are electrically connected to an electrical power supply configured to supply an alternating electrical current to the edge director assembly.

2. The glass forming apparatus of claim 1, wherein the first edge director comprises a first thickened bottom edge portion and the second edge director comprises a second thickened bottom edge portion, the first thickened bottom edge portion joined to the second thickened bottom edge portion at the edge portion joint.

3. The glass forming apparatus of claim 2, wherein the first bus bar assembly comprises a first bus bar formed from a first material joined to the first thickened bottom edge portion and a second bus bar formed from a second material different than the first material and joined to the first bus bar.

4. The glass forming apparatus of claim 3, wherein at least one of the first bus bar assembly, the second bus bar assembly, or the third bus bar assembly comprises a cooling channel configured to convey a cooling fluid therethrough.

5. The glass forming apparatus of claim 4, wherein the cooling channel comprises a hollow tube in fluid communication with a cooling fluid source.

6. The glass forming apparatus of claim 5, wherein the hollow tube is not in contact with the first material.

7. The glass forming apparatus of claim 3, wherein the second bus bar assembly comprises a third bus bar formed from the first material and joined to the second thickened bottom edge portion, and a fourth bus bar formed from the second material and joined to the third bus bar.

8. The glass forming apparatus of claim 3, wherein the third bus bar assembly comprises a central bus bar formed from the first material joined to the edge portion joint, a first branch bus bar joined to the central bus bar and a second branch bus bar joined to the central bus bar, the first branch bus bar comprising a first bus bar segment formed from the first material joined to the central bus bar and a second bus bar segment formed from the second material different from the first material joined to the first bus bar segment and the second branch bus bar comprising a third bus bar segment formed from the first material joined to the central bus bar and a fourth bus bar segment formed from the second material joined to the third bus bar segment.

9. The glass forming apparatus of claim 8, wherein an interface between the first material and the second material of the first bus bar assembly, the second bus bar assembly, and the third bus bar assembly is positioned within a surrounding deformable refractory insulating material.

10. The glass forming apparatus of claim 3, wherein the first edge director and the second edge director are formed from the first material.

11. The glass forming apparatus of claim 3, wherein the first material comprises platinum.

12. The glass forming apparatus of claim 3, wherein the second material comprises nickel.

13. The glass forming apparatus of claim 1, wherein the edge portion joint is below the bottom edge of the forming body.

14. The glass forming apparatus of claim 1, wherein the first bus bar assembly and the second bus bar assembly are supported by a first three-axis support assembly and a second three-axis support assembly, respectively, the first three-axis support assembly and the second three-axis support assembly each configured to support movement of the respective bus bar assembly along three orthogonal axes.

15. The glass forming apparatus of claim 14, wherein each of the first three-axis support assembly and the second three-axis support assembly comprises a tiltable stage configured to accommodate a tilt of the first bus bar assembly and the second bus bar assembly, respectively.

16. The glass forming apparatus of claim 14, wherein each of the first three-axis support assembly and the second three-axis support assembly supports the first bus bar assembly and the second bus bar assembly, respectively, using a spring.

17. The glass forming apparatus of claim 14, wherein the first three-axis support assembly supports a first portion of the third bus bar assembly and the second three-axis support assembly supports a second portion of the third bus bar assembly.

18. The glass forming apparatus of claim 17, wherein the first three-axis support assembly supports the first bus bar assembly and the second three-axis support assembly supports the second bus bar assembly.

19. The glass forming apparatus of claim 1, wherein the edge director assembly comprises an end cap joined to the first edge director and the second edge director, and the end cap is disposed over the first end of the forming body.

20. The glass forming apparatus of claim 1, wherein the electrical power supply is a three-phase power supply configured to supply a three-phase amplitude and phase variable electrical current to the edge director assembly.

21. The glass forming apparatus of claim 20, wherein a first phase of the three-phase power supply is connected to the first bus bar assembly, a second phase of the three-phase power supply is connected to the second bus bar assembly, and a third phase of the three-phase power supply is connected to the third bus bar assembly.

22. A method of forming a glass article comprising:

supplying molten glass to a forming body comprising a first converging forming surface and a second converging forming surface opposite the first converging forming surface, and an edge director assembly disposed at a first end of the forming body, the edge director assembly comprising a first edge director in contact with the first converging forming surface and a second edge director in contact with the second converging forming surface, the first edge director and the second edge director each comprising an outward-facing surface;

flowing the molten glass over the first and second converging forming surfaces of the forming body and the outward-facing surface of each of the first edge director and the second edge director;

heating the edge director assembly by flowing electrical current through the edge director assembly; and drawing the molten glass from a bottom edge of the forming body, wherein the electrical current comprises a three-phase electrical current, and wherein:

a first bus bar assembly is joined to the first edge director:

a second bus bar assembly is joined to the second edge director;

a third bus bar assembly is joined to a joined edge joining the first edge director to the second edge director.

23. The method of claim 22, further comprising varying a magnitude or a phase angle of at least one phase of the three-phase electrical current.

24. The method of claim 22, wherein the method further comprises supplying a first phase of the three-phase electrical current to the first bus bar assembly, supplying a second phase of the three-phase electrical current to the second bus bar assembly, and supplying a third phase of the three-phase electrical current to the third bus bar assembly.

25. The method of claim 24, wherein a magnitude of the first phase is different from at least one of a magnitude of the second phase or a magnitude of the third phase.

26. The method of claim 24, wherein an amplitude and a phase of the electrical current are independent of a frequency of the electrical current.

27. The method of claim 24, further comprising supporting the first bus bar assembly and the second bus bar assembly with a first three-axis support assembly and a second three-axis support assembly, respectively, the first three-axis support assembly and the second three-axis support assembly each configured to support movement of the respective bus bar assembly along three orthogonal axes.

28. The method of claim 27, wherein the first three-axis support assembly supports a first portion of the third bus bar assembly and the second three-axis support assembly supports a second portion of the third bus bar assembly.

* * * * *